May 16, 1939.   G. F. WIKLE   2,158,167
TIRE-SLITTING MACHINE
Filed Dec. 11, 1937   3 Sheets-Sheet 1
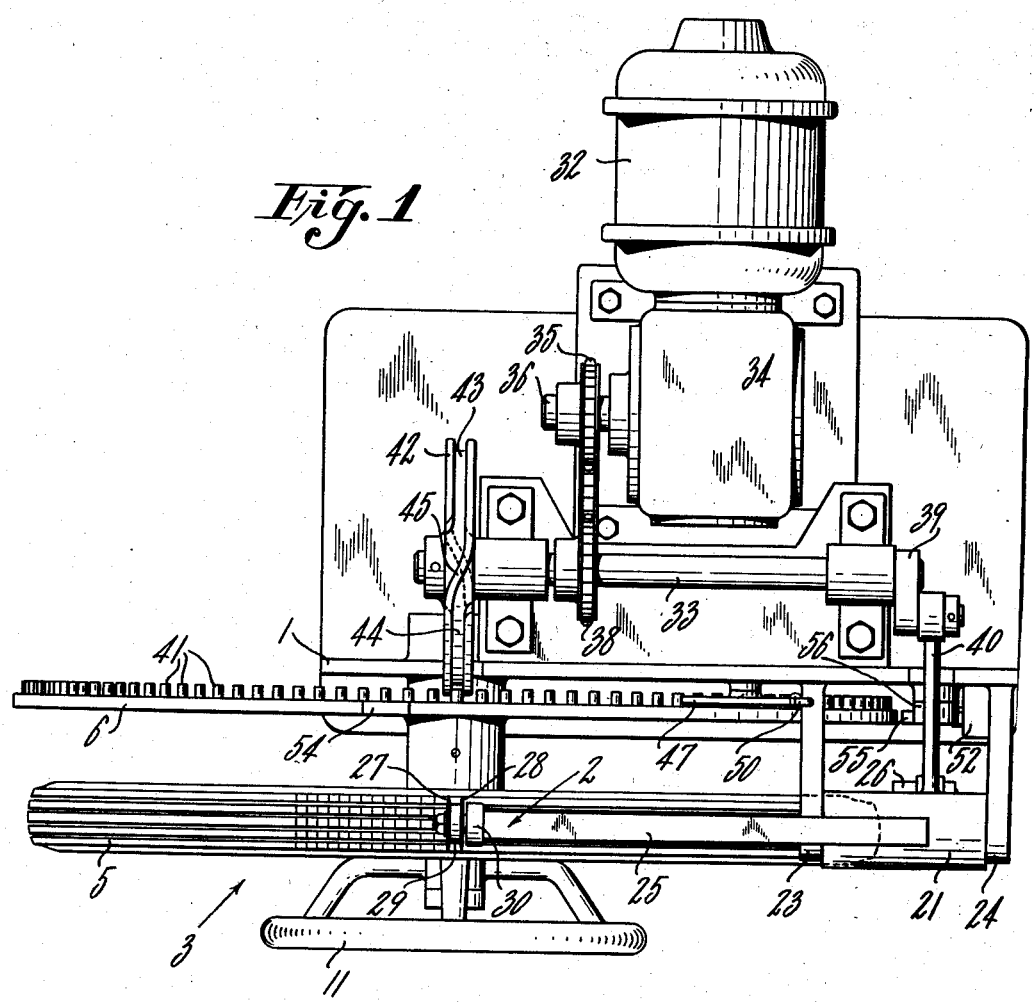
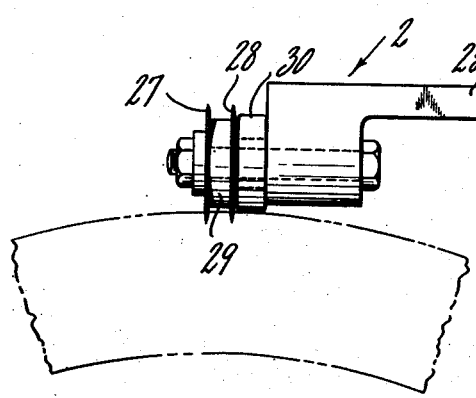
INVENTOR.
GEORGE F. WIKLE
BY
ATTORNEYS.

May 16, 1939.  G. F. WIKLE  2,158,167
TIRE-SLITTING MACHINE
Filed Dec. 11, 1937  3 Sheets-Sheet 3

INVENTOR.
GEORGE F. WIKLE
BY
ATTORNEYS.

Patented May 16, 1939

2,158,167

UNITED STATES PATENT OFFICE 2,158,167

TIRE-SLITTING MACHINE

George F. Wikle, Detroit, Mich., assignor, by mesne assignments, to United States Rubber Company, New York, N. Y., a corporation of New Jersey Application December 11, 1937, Serial No. 179,342

9 Claims. (Cl. 164—34)

This invention relates to tire manufacturing apparatus, and in particular it relates to an apparatus for slitting the treads of pneumatic tires.

For the purpose of improving the antiskid qualities and increasing the wearing properties of pneumatic tires, it has been found desirable to make small transverse slits in the tread surface thereof, without substantially removing any rubber from the tire tread.

In general the invention comprises collapsible non-pneumatic supporting means for a tire, means for imparting increments of rotation to the tire, and means for forming arcuate radial slits in the tread of the tire during rest periods of the intermittently rotating tire. The present apparatus may be used with small tires and bicycle tires.

Among the objects of the invention are, to provide a simplified automatic apparatus for slitting tire treads, to provide a quick operable and positive means for supporting a tire internally and without the application of pneumatic pressure; and to provide slitting means movable in a positive cutting path independent of the transverse curvature of the tire tread.

A present preferred embodiment of my invention is illustrated in the accompanying drawings, in which:

Fig. 1 is a plan view of a slitting machine embodying my invention;

Fig. 4 is a detailed elevational view, showing the relation of the slitting knives to a tire.

Figure 2:
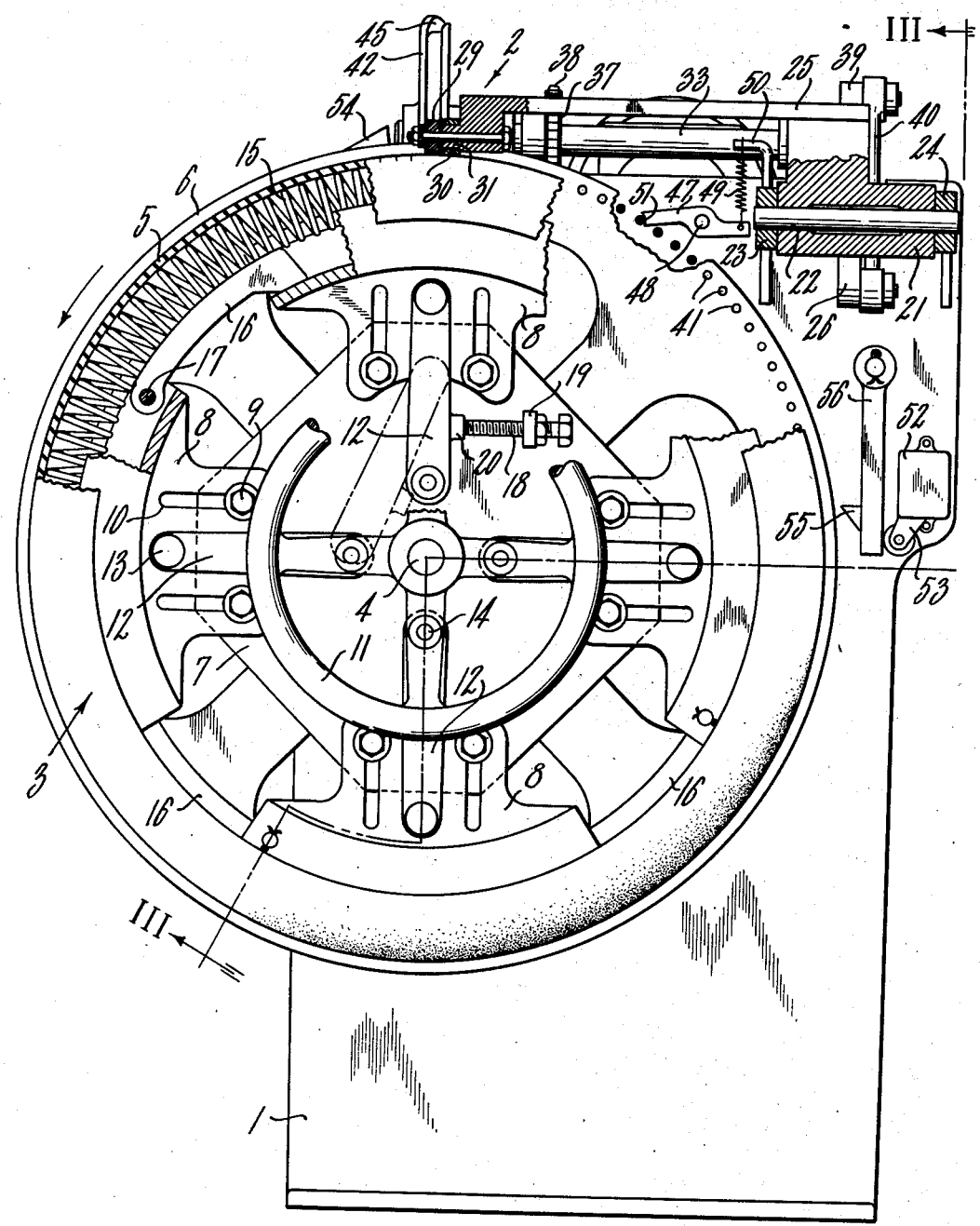
Fig. 2 is a front elevational view thereof, parts of the machine being broken away, and other parts being shown in section.

Referring to the drawings, I show a tread slitting apparatus comprising, in general, a base or frame 1 supporting a cutting unit 2 which, through an arcuate reciprocal movement, produces transverse cuts or incisions in treads of tires mounted on a chuck 3 supported from the frame by a stud shaft 4.

The chuck 3 includes expansible means, incorporating a coil spring, for maintaining a tire 5 in coaxial relation with the stud shaft 4 (Fig. 2). The shaft 4 also functions as a support for a cam follower plate 6 (later to be described) and a chuck plate 7 integral therewith. A plurality of segments 8 are attached to the chuck plate 7 and are readily slidable therewith. Bolts 9 extending through slots 10 in the segments secure the segments 8 to the chuck plate 7 in slidable relation. In front of the chuck plate 7 and mounted on the shaft 4 is a hand actuating wheel 11 pivotally connected to the segments 8 by means of the links 12. Bolts 13 and studs 14, integral with the links 12 (Figs. 2 and 3) connect the links with the segments 8 and wheel 11, respectively. The segments 8 at their outer extremities are grooved for the reception of a coil sprng 15 which extends around the periphery of the chuck. The spaces between adjacent segments 8 are spanned by hinged bridges 16 pinned at 17. The coil spring 15 is in the form of an endless annular spring in tension adapted to rest upon the segments 8 and to expand or contract upon outward or inward movement, respectively, of the segments 8.

On rotation of the wheel 11 in counter-clockwise direction, the segments are retracted and move radially inward along the slides formed by the fixed bolts 9 and the slots 10. About a one-fourth revolution of the wheel 11 is required to move the segments 8 to their retracted positions. On rotating the wheel 11 in a clockwise direction the segments are moved to their extreme extended positions against the force of the spring 15, as shown in Fig. 2. The outward, radial movement of the segments 8 and the movement of links 12 are limited by a stop screw 18 mounted in a lug 19 extending from the plate 7 and engaging with a boss 20 integral with one of the links 12. The links 12 are moved through radial positions relative to the shaft 4 and slightly over-center so as to form a locking toggle and maintain the segments 8 in extended positions.

In order to mount a tire on the chuck 3, the segments 8 are moved to retracted positions by counterclockwise rotation of the wheel 11. A pneumatic tire is placed over the spring and the segments 8 are moved radially outward by clockwise rotation of the hand wheel 11, thus forcing extension of the spring 18 to support the tire internally. A pneumatic tire 5, as thus supported by the chuck, is held in proper position in relation to the cutting mechanism 2.

The cutting unit 2 includes bell crank 21 mounted on a shaft 22 supported by brackets 23 and 24 attached to the frame 1. The lever 21 is provided with arms 25 and 26. The arm 25 extends laterally and tangentially of the tire 5 to a plane substantially in radial alignment with the axis of the chuck 3. For convenience the arm 25 preferably extends in a horizontal direction. A pair of disc-like cutters 27 and 28 are mounted at the extremity of the horizontally extending arm 25. The arm 26 rocks the bell crank 21.

The cutters are rigidly bolted to the arm 25 and are held in spaced relation by means of a collar 29. A roller 30 mounted on an extension 31 of the arm 25 engages with tire 5 and limits the depth of slits. Variations in the depth of the slits may be effected by substituting cutters of different diameters. The only purpose of making the cutters in circular form is to permit occasional rotary adjustment of the cutters, thereby presenting sharpened edges to the active slitting portion of the cutters.

In order to rock the bell crank 21 about its fulcrum 22 (Figs. 1 and 3), I provide a motor 32 together with suitable connecting means mounted on the frame 1. The motor 32 drives a shaft 33 through a speed reduction unit 34, sprocket 35 on shaft 36, and chain 37 passing over sprocket 38 keyed to the shaft 33. A crank 39 is keyed to the shaft 33 and a link 40 is pivotally pinned to the crank and to the arm 26. Thus, continuous motion on the shaft 33 is translated to oscillatory motion of the bell crank 21. Rotation of the motor 32, therefore, causes the knives 27 and 28 to oscillate transversely in an arcuate path across the tread of the tire 5.

The chuck 3 (Fig. 1) carrying the tire 5 is intermittently rotated in one direction by the motor 32. A multiplicity of followers 41, in the form of pins, extending from the side of the cam plate 6 are positioned in spaced relation concentric with the axis of the chuck 3 (Fig. 2). A cam wheel 42 (Fig. 1), pinned to the shaft 33, is provided with grooves 43 and 44 at the periphery thereof which are separated from each other by diametrically opposite cams 45 and 46, respectively. The relation between the cam wheel 42 and the circular pitch of any two adjacent followers 41 is such that, as rotation of the cam wheel 42 causes disengagement of one follower, the adjacent succeeding follower is moved into engagement with the diametrically opposite companion groove. For example, as the follower in engagement with the groove 44 is moved to the left by engagement with cam 46 the succeeding follower concurrently moves toward the left. By the time the first mentioned follower is free of the wheel 42 by continuous rotation thereof, the succeeding follower has been moved to a point in engagement with the groove 43. By this cam actuating means, the cam wheel 42 rotates continuously and imparts increments of rotary motion to the cam plate 6 which transmits the motion to the tire 5 mounted on the chuck 3.

Figure 3:
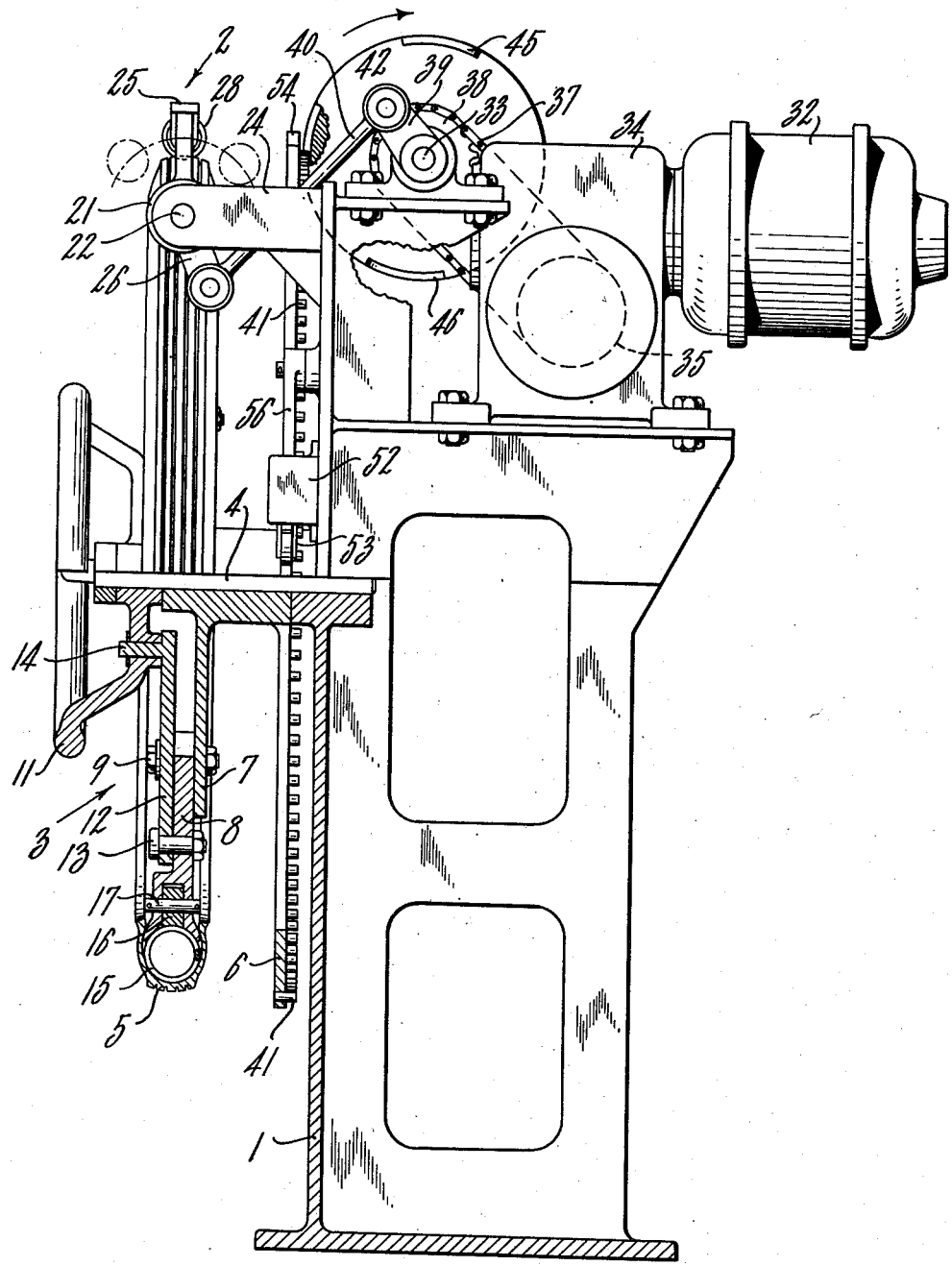
Fig. 3 is an end elevational view of the apparatus, partly in section, taken on section line III—III of Fig. 2.

The cutting means and tire rotating means are inter-connected in a positive manner in order to assure effective coordination therebetween, thus restricting the operation of the cutting means to rest periods of the intermittently rotating tire. In Fig. 3 the knives carried by the bell crank 21 are shown in a midway position relative to the tire 5, that is, in the middle of a cutting cycle. From this position the knives rock about the shaft 22 to extreme positions indicated by the dot and dash lines. At approximately the time that the knives 27 and 28 pass through and just beyond the sides of the tire tread, the follower in engagement with one of the grooves 43 or 44, as the case may be, engages one of the cams 45 and 46 thus moving the tire through an index cycle. By the time the knives have reached one of the extreme positions as indicated, the process of indexing is complete and the knives are ready for another cutting cycle. The axial distance between the knives 27 and 28 is preferably equal to one-half the circular pitch of the followers 41. This is necessary in order to provide proper spacing of the slits due to the use of double knives.

Ratchet means is provided to prevent backward rotation of the tire 5 (Fig. 2) and consequent irregular slits in the tire. A pawl 47 is pivoted to the frame 1 at 48, and a spring 49 attached to an extension of bracket 50 normally maintains the pawl in engagement with the followers 41. The pawl 47 has a curved extremity 51 adapted to contact one of the followers 41 so as to prevent backward movement of the plate 6.

Electric switch means is employed for automatically stopping the machine when a required number of slits are cut into the periphery of the tire. This automatic control is effected by means of a switch 52 (Fig. 2) adapted to interrupt the flow of electric current to the motor 32 by movement of a switch arm 53. A cam 54 is attached to the plate 6 at the periphery thereof, and, upon completion of the desired cutting operation upon the tire 5, strikes a second cam 55 extending from an arm 56 pivotally pinned to the frame 1 at 57. The cam 54 through engagement with the cam 55 causes the arm 56 to move to such a position as to open the switch 52. In this manner the motor 32 is stopped and the tire 5 brought to rest.

In order to start the machine an operator closes a push button switch (not shown) connected in electrically parallel circuit with the switch 52. This starts the motor 32 and moves the cam 54 from engagement with the cam 55, thus allowing gravity to swing the arm 56 to vertical position and the switch 52 to close.

The apparatus of the present invention is particularly useful in slitting the treads of smaller sized tires and bicycle tires where the slitting knives move through a fixed arc and are not directly supported on the tire tread. Also the tire is mechanically supported without the use of fluid pressure.

While I have shown and described a present preferred embodiment of my invention, it is to be understood that modifications may be made therein within the spirit of the invention and the scope of the appended claims.

Having thus described my invention, what I claim and desire to protect by Letters Patent is:

1. An apparatus for slitting treads of pneumatic tires comprising means for rotatably supporting a tire, driving means for intermittently imparting increments of rotary motion to the supporting means, a knife mounted for movement in an arcuate path transversely of a tire mounted on the tire supporting means, means for supporting the knife having a pivot lying within the trans-axial projection of the tire and substantially tangentially to the area of engagement of the tire and the knife, and means for actuating the knife.

2. An apparatus for slitting treads of pneumatic tires comprising a chuck for rotatably supporting a tire, a cam plate attached to the chuck, driving means for intermittently imparting increments of rotary motion to the cam plate, a knife adaptable for movement in an arcuate path transversely of a tire mounted on the chuck having a pivot lying within the trans-axial projection of the tire for supporting the knife, and means for actuating the knife.

3. An apparatus for slitting treads of pneumatic tires comprising a chuck for rotatably supporting a tire, a cam plate attached to the chuck, driving means for intermittently imparting increments of rotary motion to the cam plate, a knife adaptable for movement in an arcuate path transversely of the tire, means having a pivot lying within the trans-axial projection of the tire for supporting the knife, and means for actuating the knife during the rest periods of the intermittently rotatable support.

4. In an apparatus for slitting treads of pneumatic tires, a chuck comprising a plurality of peripherally grooved segments mounted for radial movement, and an annular coil spring seating in the grooves of the segments by the tension of the coil spring, said coil spring serving to engage the interior of a tire and to function as the principal support for the tire.

5. In an apparatus for slitting treads of pneumatic tires, a chuck comprising a plurality of spaced peripherally grooved segments mounted for radial movement, an annular coil spring seating in the grooves of the segments under its own tension, said coil spring being shaped to engage the interior of a tire and to function as the principal support for the tire, and an arm forming a bridge over the spaces between adjacent segments for supporting the spring between segments.

6. An apparatus for slitting treads of pneumatic tires comprising a coil spring for engaging the interior of a tire and for functioning as the principal support for the tire, means for radially contracting and expanding the coil spring, driving means for intermittently imparting increments of rotary motion to the spring, a knife adaptable for movement in an arcuate path transversely of the spring for slitting a tire mounted thereon, means for supporting the knife comprising a pivot lying within the trans-axial projection of the tire, and means for actuating the knife.

7. An apparatus for slitting treads of pneumatic tires comprising a coil spring for engaging the interior of a tire and functioning as the principal support for the tire, means for radially contracting and expanding the coil spring, driving means for intermittently imparting increments of rotary motion to the spring, a knife mounted for movement in an arcuate path transversely of the spring, means including a pivot lying within the trans-axial projection of the tire for supporting the knife, and means for actuating the knife during the rest periods of the intermittently rotating spring.

8. An apparatus for slitting treads of pneumatic tires comprising a coil spring for engaging the interior of a tire and functioning as the principal support for the tire, means for radially contracting and expanding the coil spring, driving means for intermittently imparting increments of rotary motion to the spring, a knife having movement in an arcuate path transversely of the tire, means including a pivot lying within the trans-axial projection of the tire for supporting the knife, said pivot being in substantially tangential alignment with the area of contact of the tire and knife, and means for actuating the knife.

9. An apparatus for slitting treads of pneumatic tires comprising a coil spring for engaging the interior of a tire and functioning as the principal support for the tire, means for radially contracting and expanding the coil spring, driving means for intermittently imparting increments of rotary motion to the tire, a knife mounted for movement in an arcuate path transversely of the tire, means for actuating the knife during the rest periods of the intermittently rotating tire, means including a pivot lying within the trans-axial plane of the tire for supporting the knife, said pivot being in substantial alignment with the center of the transverse radius of curvature defining the tread surface profile, and means for actuating the knife.

GEORGE F. WIKLE.